(12) United States Patent
Fujii

(10) Patent No.: US 6,253,231 B1
(45) Date of Patent: Jun. 26, 2001

(54) SYSTEM AND METHOD FOR INCORPORATING IMAGE DATA INTO ELECTRONIC MAIL DOCUMENTS

(75) Inventor: Toshiya Fujii, Menlo Park, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/168,037

(22) Filed: Oct. 7, 1998

(51) Int. Cl.[7] ................................................. G06F 13/00
(52) U.S. Cl. ............................................................. 709/206
(58) Field of Search .................................................. 709/206

(56) References Cited

U.S. PATENT DOCUMENTS 5,768,505 * 6/1998 Gilchrist et al. ..................... 709/201
6,014,689 * 1/2000 Budge et al. ......................... 709/206
6,101,320 * 8/2000 Schuetze et al. ..................... 709/206

\* cited by examiner

*Primary Examiner*—Kenneth R. Coulter
(74) *Attorney, Agent, or Firm*—Gregory J. Koerner; Simon & Koerner LLP

(57) ABSTRACT

A system and method for incorporating image data into electronic mail documents, comprising an image input device to generate image data, a processor to manipulate the image data, a text input module to receive text data, and a display module to combine the image data with the text data. The invention also includes a graphic conversion module to convert the image data into graphic data format, an e-mail conversion module to convert the graphic data and text data into an e-mail document, and means for sending the e-mail document to the Internet.

8 Claims, 7 Drawing Sheets

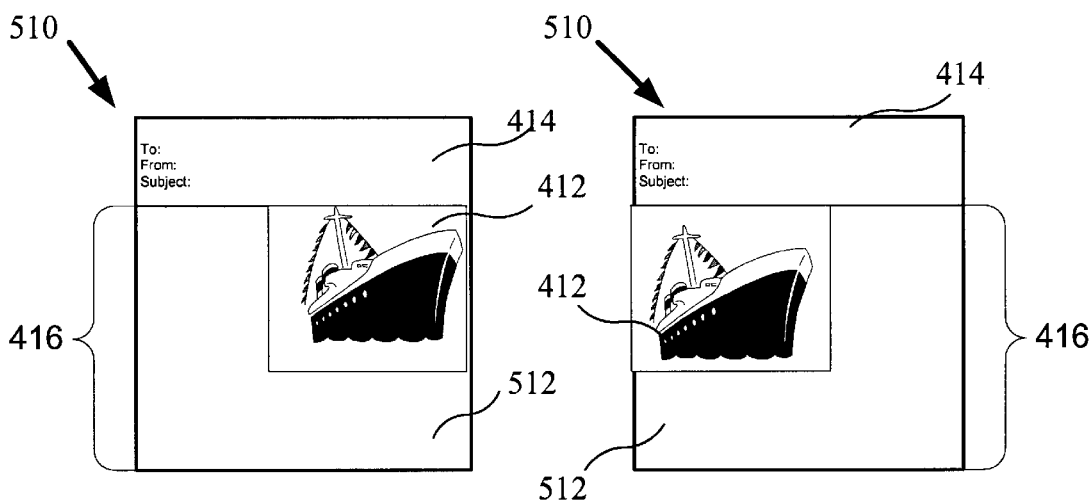
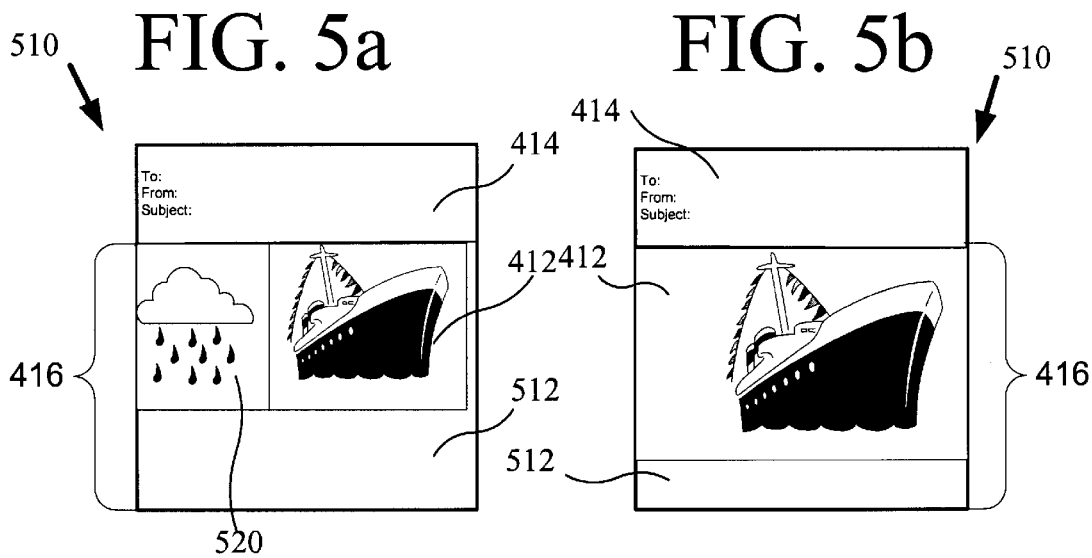
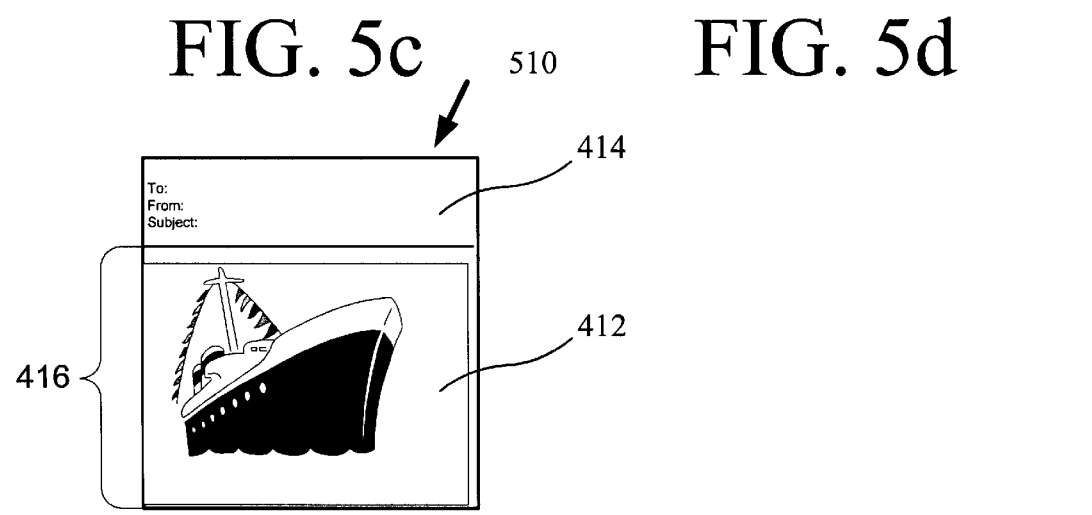

SYSTEM AND METHOD FOR INCORPORATING IMAGE DATA INTO ELECTRONIC MAIL DOCUMENTS

BACKGROUND OF THE INVENTION

1. Field of the Invention

This invention relates generally to electronic mail processing systems, and relates more particularly to a system and method for incorporating image data into electronic mail documents.

2. Description of the Background Art

Implementing an efficient and effective method for incorporating image data into electronic documents is a significant consideration of system designers and manufacturers. However, the techniques available to incorporate the image data are often difficult or cumbersome to utilize.

With the increased use of the Internet as a means for communication, the use of electronic mail (e-mail) for business and personal communications has rapidly increased. Because traditional e-mail systems have been text based rather than graphics based, however, consumers have sometimes been reluctant to use e-mail instead of traditional means of communication, such as telephones and letters.

For example, consumers often desire the ease of including pictures with a letter, combined with the immediate communication afforded by a telephone conversation. Although traditional e-mail systems offer the immediate communication of the telephone, they do not offer an easy method for including a picture with the communication. Consumers may desire the ability to include a picture of a graduation ceremony or birthday celebration together with a communication, so that the picture is displayed concurrently with their discussion of the event. As another example, consumers may desire to easily and quickly include directions to a party, or to their home, in the form of hand-drawn maps included directly within the e-mail document.

E-mail system developers have attempted to meet consumer demands by allowing graphic data (i.e., pictures) to be included with e-mail messages in the form of attachments or separate files. Thus, to send a picture with an e-mail message, the system user is typically required to load or input the picture into the computer by the use of a scanner or a video input device. The system user must then convert the picture into a format suitable for attachment to the e-mail document, and then electronically attach the picture to the e-mail document. After the system user finishes creating the e-mail document, the e-mail software converts both text and picture (as separate files) into a suitable format for transmission over a networked source such as the Internet, and then transmits the files to a selected designation.

Once the e-mail document is received, the viewer of the e-mail document must then decode the picture in order to view it. In the typical e-mail processing software, the e-mail software automatically performs the decoding process. However, the attached picture still remains a separate file from the e-mail document and is only "linked" to the e-mail document by some electronic means. To view the attached pictures, the viewer must start a separate, program that displays the attached pictures.

The traditional process for including pictures in an e-mail document requires expensive equipment. In addition, the process is cumbersome and time consuming. The process requires extra equipment to load or input the picture into the e-mail system, and separate computer programs to convert the pictures into a size and format suitable for manipulation by the e-mail system. In addition, because the picture file is always a separate file from the e-mail document, the picture file may be lost or not properly "linked" to the e-mail document at any point in the process. This results in the viewer not being able to view the picture as intended by the sender.

Thus, the foregoing problems present significant obstacles to effectively implementing an efficient method for incorporating image data into electronic documents.

SUMMARY OF THE INVENTION

This invention relates generally to electronic mail processing systems, and relates more particularly to a system and method for incorporating image data into electronic mail documents. In the preferred embodiment, a CPU initially sets a video input flag to ON. A display module then loads a selected window template from memory and displays image input data on a television. The window template specifies relative areas on the television and the e-mail document where the image data and text data are to be displayed. The CPU then waits for the system user to input commands or to enter key input from a keyboard.

Next, the CPU determines whether the system user has pressed a FREEZE button on the keyboard. If the system determines that the FREEZE button has been pressed, then a graphics conversion module responsively converts the image input data into graphic data and stores the graphic data. Then, the CPU sets the video input flag to OFF and the CPU continues processing.

The CPU then determines whether the system user has pressed an UN-FREEZE button on the keyboard. If the CPU determines that the UNI-FREEZE button has been pressed, then the CPU deletes the graphic data from memory and sets the video input flag to ON.

Next, the CPU determines whether the system user has entered key input from the keyboard. If the CPU determines that the user has entered key input, then an e-mail manager responsively incorporates and saves the key input characters as text data.

Then, the display module determines the status of the video input flag. If the video input flag is set to OFF, then the display module combines the graphic data with the text data for display on the television. However, if video input flag is set to ON, then the display module combines the image input data with the text data for display on the television.

Next, the CPU determines whether the system user has pressed a SEND button on the keyboard. If the CPU determines that the SEND button has been pressed, then an e-mail conversion module converts the graphic data and text data into an e-mail document that is suitable for processing by the e-mail manager. If the video input flag is set to ON, the graphic conversion module first converts the image input data into graphic data and then saves the graphic data before the foregoing conversion process occurs. The e-mail manager then forwards the e-mail document to the Internet to complete the e-mail process.

The present invention thus provides a system and method to directly incorporate image data into an e-mail document. In addition, the present invention provides a system and method to capture a variety of image data types and to send an integrated, e-mail document over a networked source such as the Internet.

BRIEF DESCRIPTION OF THE DRAWINGS

FIGS. 5a through 5e are representations of alternate embodiments for window formats used to pre-format the placement of text data and image input data or graphic data within an e-mail document;

DETAILED DESCRIPTION OF THE PREFERRED EMBODIMENT

The present invention relates to an improvement in electronic mail processing systems. The following description is presented to enable one of ordinary skill in the art to make and use the invention and is provided in the context of a patent application and its requirements. Various modifications to the preferred embodiment will be readily apparent to those skilled in the art and the generic principles described here may be applied to other embodiments. Thus, the present invention is not intended to be limited to the embodiment shown, but is to be accorded the widest scope consistent with the described principles and features.

The present invention comprises a system and method for incorporating image data into electronic mail (e-mail) documents. The invention includes an image input device to generate image data, a processor to manipulate the image data, a text input module to receive text data, and a display module to display the image data and the text data. The invention also includes a graphic conversion module to convert the image data into graphic data format, an e-mail conversion module to convert the graphic data and text data into an e-mail document, and means for sending the e-mail document to a distributed network such as the Internet.

Figure 1:
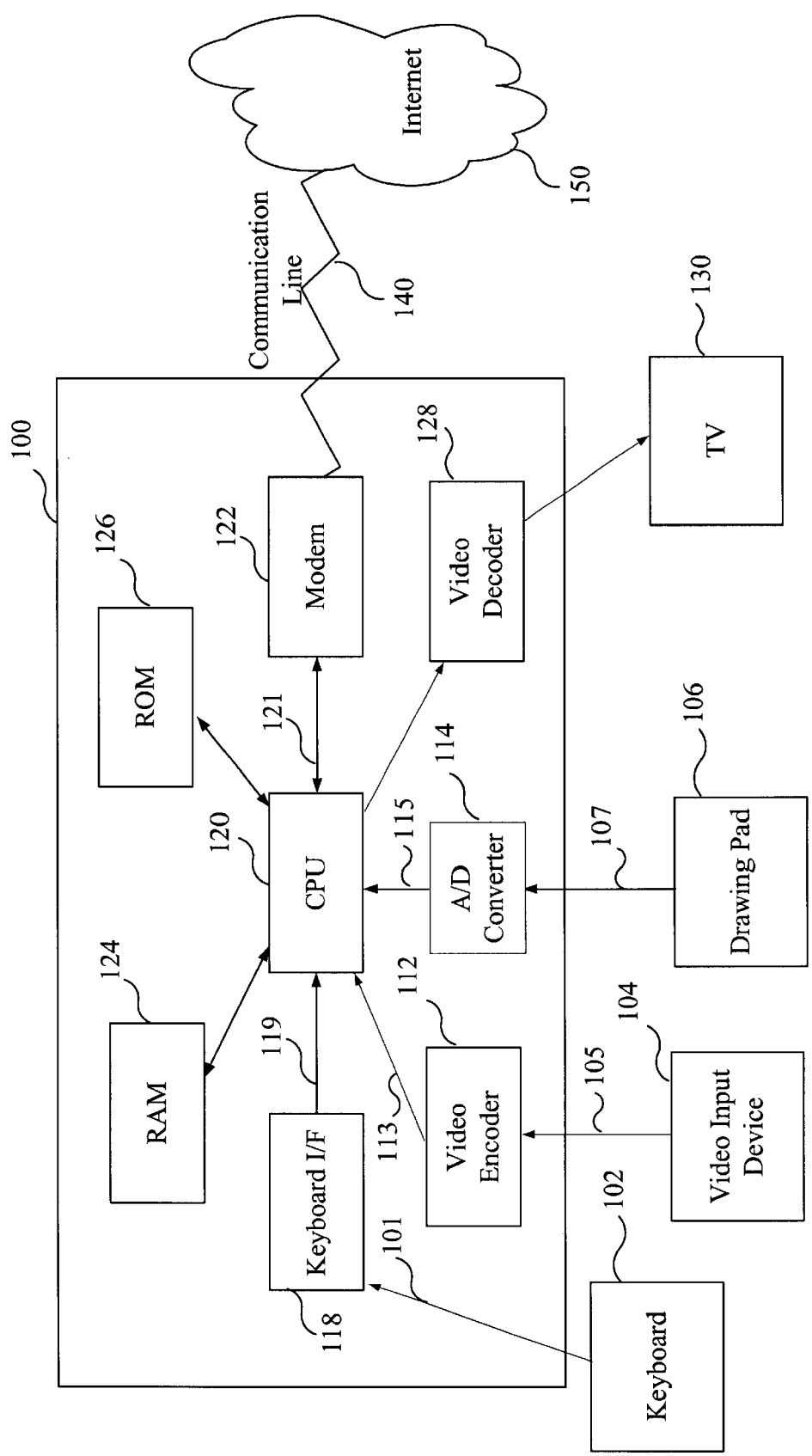
FIG. 1 is a block diagram of one embodiment of a computer system, according to the present invention.

Referring now to FIG. 1, a block diagram for one embodiment of a computer system 100 is shown, in accordance with the present invention. In other embodiments, computer system 100 may be a set-top box, a Personal Digital Assistant (PDA), or any other appropriate electronic device. The FIG. 1 embodiment includes a television (TV) 130, a keyboard 102, a video input device 104, and a drawing pad 106. Computer system 100 preferably includes a modem 122, a central processing unit (CPU) 120, a read-only memory (ROM) 126, a random-access memory (RAM) 124, a video decoder 128, a video encoder 122, and an analog-to-digital converter 114.

In the FIG. 1 embodiment, video input device 104 may include a video camera, a video digitizer, or any other device for inputting image data into computer system 100. Video input device 104 preferably generates a video signal that is transferred via line 105 to video encoder 112 which then converts the video signal into digital video data that is suitable for processing by CPU 120. Video encoder 112 transfers the video data via line 113 to CPU 120 which stores the video data into RAM 124 as image input data.

In addition, the FIG. 1 computer system 100 includes drawing pad 106 for inputting stroke data (an analog signal) into CPU 120. Drawing pad 106 transfers the analog stroke data via line 107 to analog-to-digital converter 114. Analog-to-digital converter 114 then converts the analog stroke data into digital drawing pad data that is suitable for processing by CPU 120. Analog-to-digital converter 114 then transfers the digital drawing pad data via line 115 to CPU 120 which stores the digital drawing pad data into RAM 124 as image input data. Analog-to-digital converter 114 preferably converts the analog stroke signal into positional, x-y coordinate data.

The FIG. 1 computer system 100 also includes keyboard 102 for inputting key input into computer system 100. Keyboard 102 transfers the key input via line 101 to keyboard interface 118 which then transfers the key input via line 119 to CPU 120. The CPU 120 receives the key input and stores it as text data in RAM 124. The text data and the image input data (video image data and/or drawing pad data) may be decoded by video decoder 128 and displayed together on television 130, in accordance with the present invention. The system 100 converts the text data and image input data into an e-mail document that CPU 120 forwards, via modem 122 and communication line 140, to the Internet 150. In alternate embodiments, the e-mail document may be forwarded to any other networked system.

Figure 2:
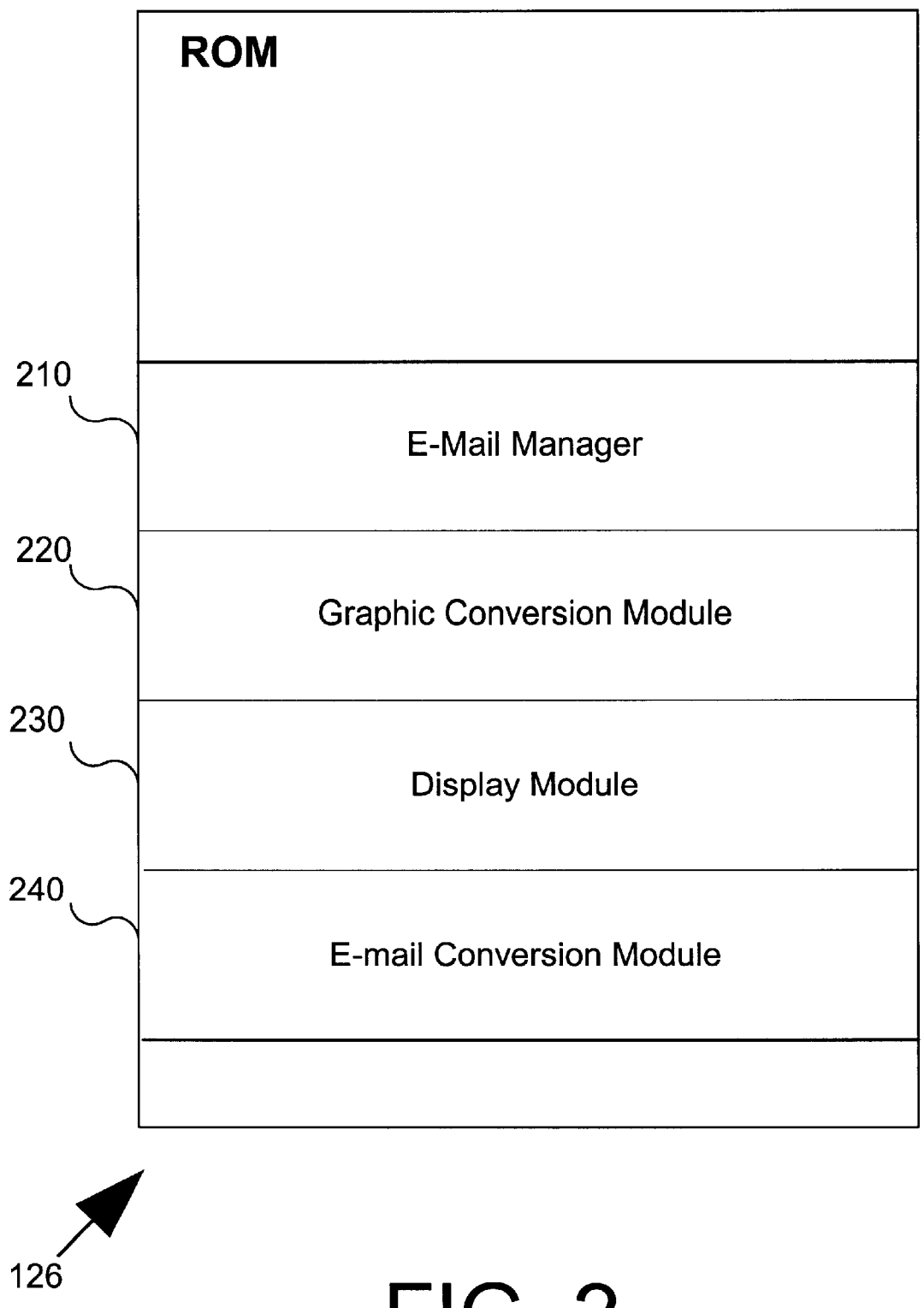
FIG. 2 is a representation of one embodiment of the read-only memory of FIG. 1.

Referring now to FIG. 2, a representation of one embodiment of read-only memory (ROM) 126 of FIG. 1 is shown. In the FIG. 2 embodiment, ROM 126 includes e-mail manager 210, graphic conversion module 220, display module 230, and e-mail conversion module 240. E-mail manager 210 includes a series of instructions that CPU 120 executes to advantageously transmit e-mail documents to a networked source, such as the Internet, and to also acquire and store e-mail documents received from the networked source.

Graphic conversion module 220 includes a series of instructions that CPU 120 executes to convert image input data (both video image data and drawing pad data) into graphic data. In the preferred embodiment, graphic conversion module 220 converts the image input data into Joint Photographic Experts Group (JPEG) formatted data. Alternatively, the image input data may be converted into Graphics Interchange Format (GIF) formatted data or any other appropriate format.

Display module 230 includes a series of instructions that CPU 120 executes to display the image input data or graphic data, together with the text data on television 130. E-mail conversion module 240 includes a series of instructions that CPU 120 executes to convert the graphic data and the text data into an e-mail document having a format suitable for transmission by e-mail manager 210. In the preferred embodiment, e-mail conversion module 240 converts the data into hypertext mark-up language (HTML) format. Alternatively, e-mail conversion module 240 may convert the data into any format suitable for transmission over the Internet 150.

Figure 3:
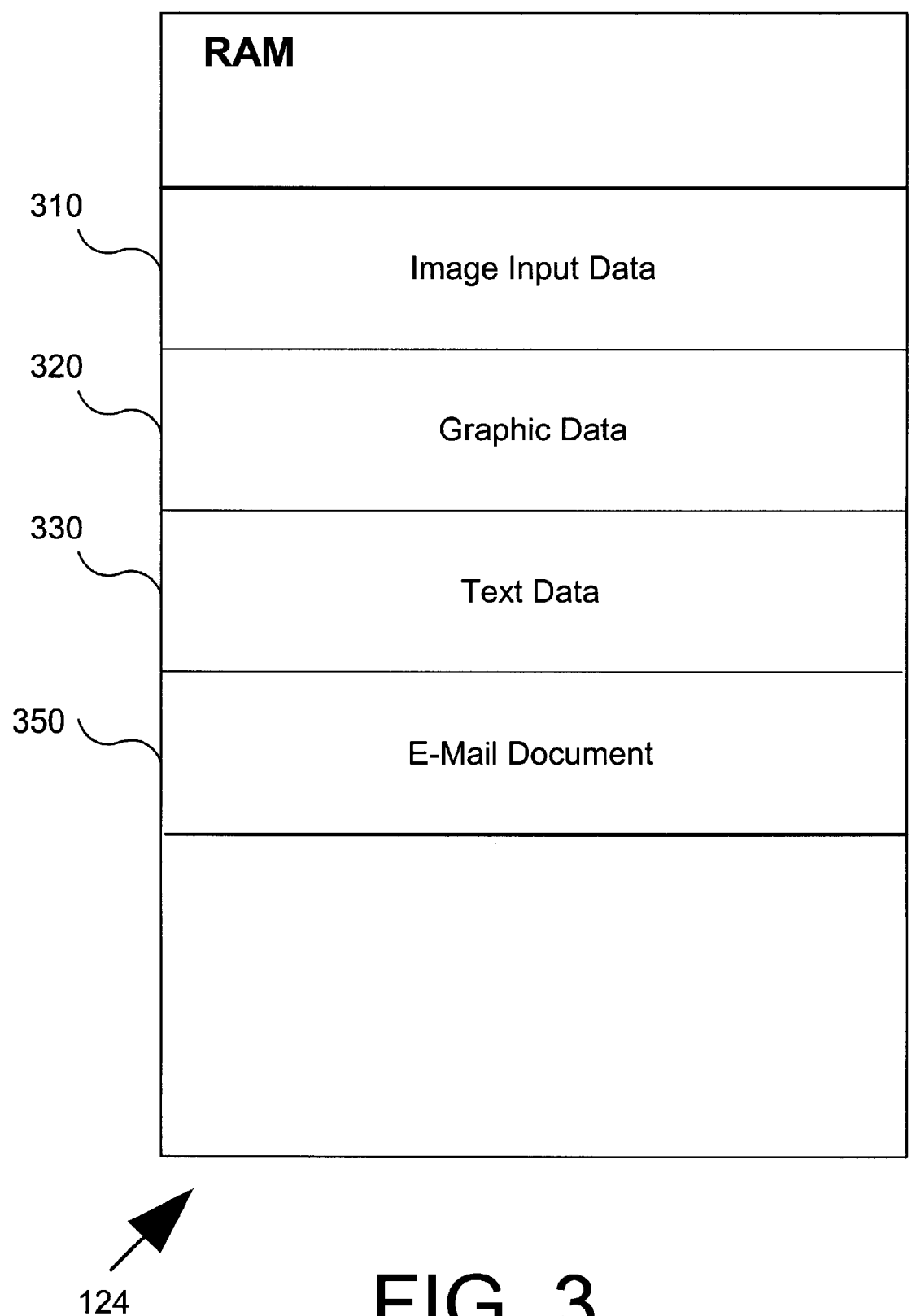
FIG. 3 is a representation of one embodiment of the random access memory of FIG. 1.

Referring now to FIG. 3, a representation of one embodiment for random access memory (RAM) 124 of FIG. 1 is shown. In the FIG. 3 embodiment, RAM 124 includes image input data 310, graphic data 320, text data 330, and e-mail document 350.

CPU 120 stores the video image data and drawing pad data as they are received into computer system 100 into image input data 310. Graphic conversion module 220 stores the graphic file converted from image input data 310 into graphic data 320. CPU 120 stores key input from keyboard 102 into text data 330. E-mail conversion module 240 stores the converted graphic data 320 and text data 330 into e-mail document 350.

Figure 4:
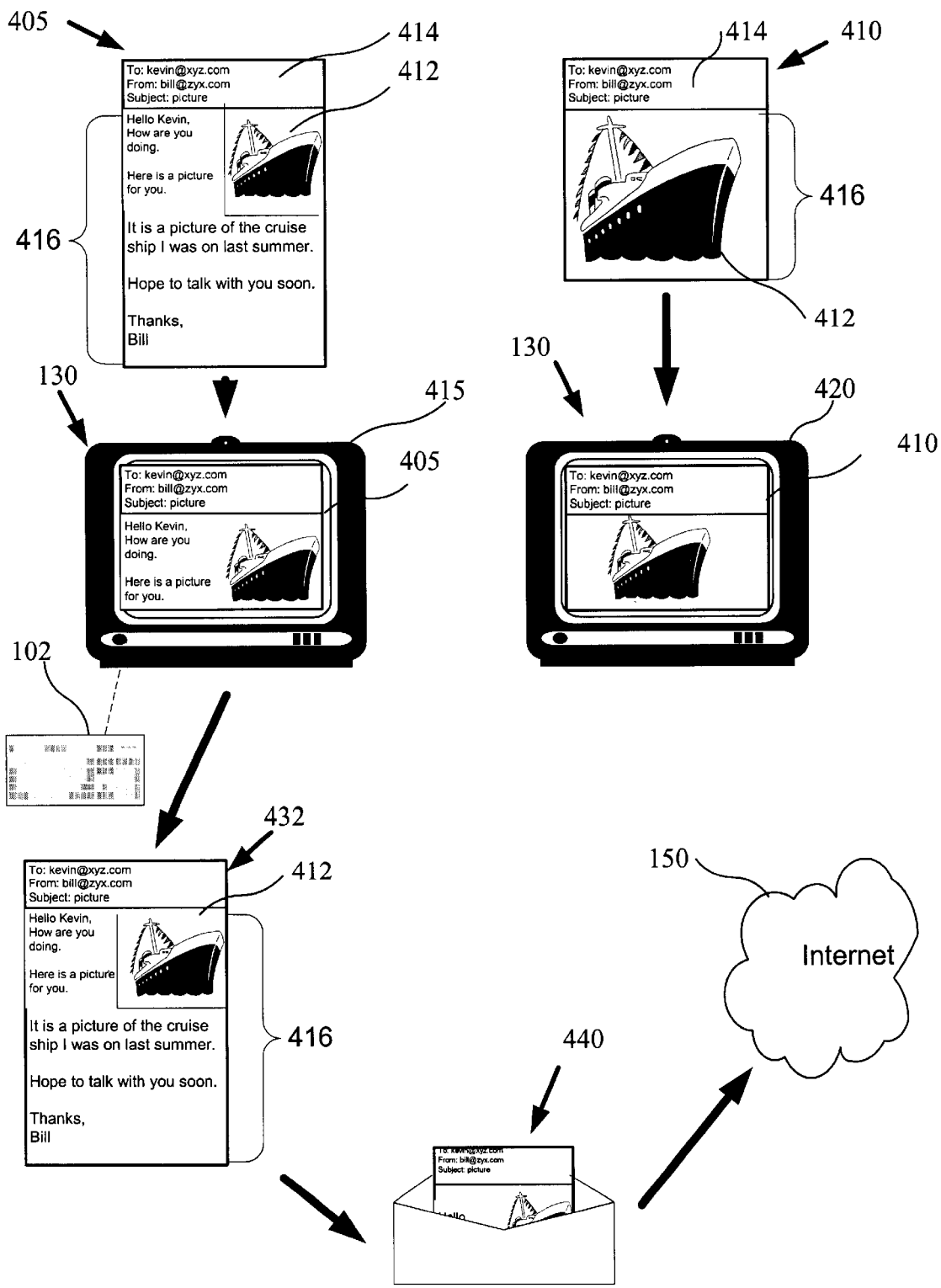
FIG. 4 shows a representation of a sequence of operation configurations to incorporate image input data into an e-mail document, according to the present invention.

Referring now to FIG. 4, a representation of a sequence of operation configurations for incorporating image input data 310 into e-mail document 350 is shown, according to the present invention. In the FIG. 4 representation, image input data 310 and text data 330 are shown incorporated into two, pre-formatted window template formats: format one 405 and format two 410. Format one 405 shows image input data 310 placed in image area 412 in the upper right-hand corner of main document page 416. Format two 410 shows image area 412 occupying the entire main document page 416. In addition, both format one 405 and format two 410 show address area 414. Preferably, image area 412 is continuously updated with image input data 310 received from video input device 104 or drawing pad 106 until the user presses a FREEZE button on keyboard 102. In alternate embodiments, the FREEZE button may be on a remote control or other input device.

The FIG. 4 representation next shows configuration one 415 in which format one 405 is displayed on television 130. Similarly, configuration two 420 shows format two 410 displayed on television 130. Then, as shown in graphic configuration 432, once the user presses the FREEZE button on keyboard 102, graphic conversion module 220 converts image input data 310 into graphic data 320, which is then displayed within image area 412. If the user presses a SEND button on keyboard 102, the e-mail conversion module 240 converts text data 330 and graphic data 320 into e-mail document 350, shown in FIG. 4 as e-mail configuration 440. E-mail manager 210 then sends e-mail document 350 to Internet 150.

Referring now to FIGS. 5a through 5e, representations of alternate embodiments for window templates 510 are shown. Display module 230 uses window templates 510 to pre-format the placement of text data 330 and image input data 310 or graphic data 320 for display on television 130. In addition, e-mail conversion module 240 uses window templates 510 for creating e-mail document 350. In the FIGS. 5a through 5e embodiments, each window template 510 includes address area 414 and image area 412. FIGS. 5a through 5d also contain text input area 512. CPU 120 automatically sizes image input data 310 or graphic data 320 to fit image area 412 for each window template 510 embodiment.

Referring to FIG. 5a, image area 412 occupies the upper-right portion of main document page 416. In the FIG. 5a embodiment, text input area 512 occupies the remaining area of main document page 416. Thus, text data 330 may be entered to the left of image area 412 and below image area 412.

Referring to FIG. 5b, image area 412 occupies the upper-left portion of main document page 416 and text input area 512 occupies the remaining area of main document page 416. Text data 330 may be entered to the right of image area 412 and below image area 412.

Referring to FIG. 5c, image area 412 occupies the upper-right portion of main document page 416. In addition, the FIG. 5c embodiment includes graphic area 520, which occupies the upper-left portion of main document page 416, for inclusion of other graphical data other than input image data 310 or graphic data 320 (for example, a business logo). Text input area 512 of the FIG. 5c embodiment occupies the bottom portion of main document page 416.

Referring to FIG. 5d, image area 412 occupies the upper portion of main document page 416. In the FIG. 5d embodiment, text input area 512 is located in the bottom portion of main document page 416.

Referring to FIG. 5e, image area 412 occupies the entire main document page 416 and no text input area 512 is provided.

Figure 6:
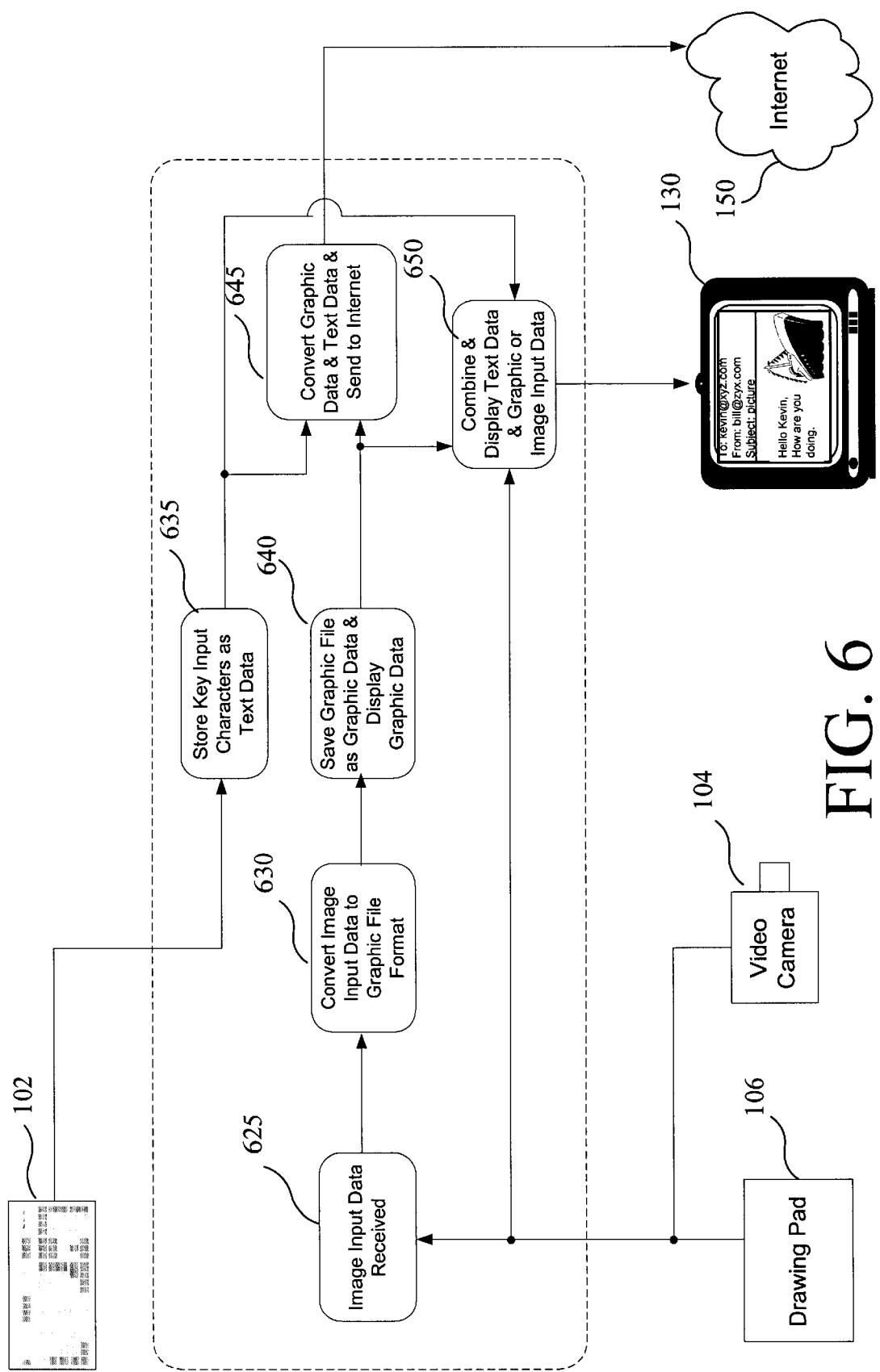
FIG. 6 is a block diagram illustrating one embodiment for the operation of the present invention.

Referring now to FIG. 6, a block diagram of one embodiment illustrating the operation of computer system 100 is shown, according to the present invention. In the FIG. 6 embodiment, CPU 120, in block 625, receives image input data 310 from video input device 104 or from drawing pad 106. Display module 230 simultaneously displays image input data 310 on television 130 in block 650. At block 630, graphic conversion module 220 converts image input data 310 into a suitable graphic file format after the user has pushed a FREEZE or SEND button on keyboard 102. Preferably, graphic conversion module 220 converts image input data 310 into JPEG format data. At block 640, CPU 120 saves the converted graphic file (JPEG format data) as graphic data 320 and display module 230 displays the graphic data 320 on television 130. CPU 120 preferably displays graphic data 320 until the system user presses an UN-FREEZE button or the SEND button on keyboard 102. If the user presses the UN-FREEZE button, CPU 120 deletes graphic data 320 and displays image input data 310 on television 130.

In the FIG. 6 embodiment, the system user may enter key input on keyboard 102. At block 635, e-mail manager 210 encodes the key input and saves the key input as text data 330 in RAM 124. At block 650, display module 230 also positions text data 330 within text input area 512 and displays text data 330 on television 130. Further, text data 330 is combined with either image input data 310 or graphic data 320 by display module 230 for display on television 130. In the preferred embodiment, display module 230 positions text data 330 and image input data 310 or graphic data 320 on television 130 based upon a selected window template 510.

After the system user pushes the SEND button on keyboard 102, then e-mail conversion module 240 combines text data 330 with graphic data 320, converts the combined document to e-mail document 350, and sends e-mail document 350 to Internet 150. In the preferred embodiment, after e-mail document 340 is sent, television 130 returns to displaying whatever was being displayed prior to the system user initiating the foregoing e-mail process.

Figure 7:
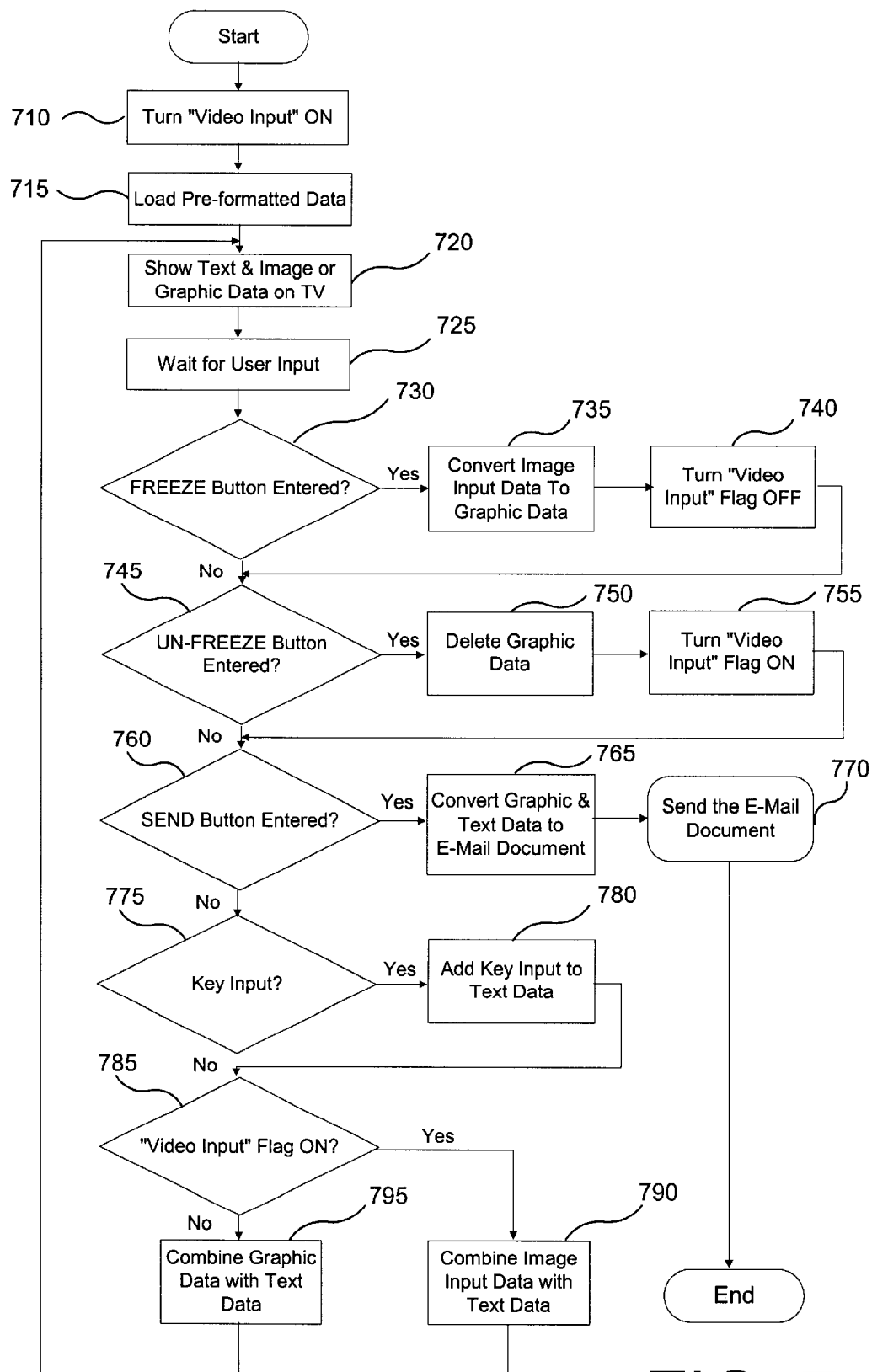
FIG. 7 is a flowchart of the preferred method steps for incorporating image data into e-mail documents, according to the present invention.

Referring now to FIG. 7, a flowchart of the preferred method steps for incorporating image input data 310 into e-mail document 350 is shown. Initially, in step 710, CPU 120 set a video input flag to ON. Then, in step 715, display module 230 loads a pre-formatted window template 510.

Next, in step 720, display module 230 displays image input data 310 or graphic data 320 and text data 330 on television 130. Initially, display module 230 displays image input data 310 because the video input flag is ON. In subsequent passes through step 720, display module 230 displays graphic data 320 with text data 330 if the video input flag is OFF, or displays image input data 310 with text data 330 if the video input flag is ON, as discussed below. Then, in step 725, CPU 120 waits for the system user to input commands from keyboard 102, or enter key input from keyboard 102.

Then, in step 730, CPU 120 determines whether the system user has pressed the FREEZE button on keyboard 102. If the FREEZE button has not been pressed, then the system continues processing at step 745. However, in step 730, if CPU 120 determines that the FREEZE button has been pressed, then, in step 735, graphic conversion module 220 responsively converts image input data 310 into a graphic file, preferably JPEG formatted data, and stores the graphic file as graphic data 320. Then, in step 740, CPU 120 sets the video input flag to OFF and CPU 120 continues processing the FIG. 7 method steps at step 745.

In step 745, CPU 120 determines whether the system user has pressed the UN-FREEZE button on keyboard 102. If the UN-FREEZE button has not been pressed, then CPU 120 continues processing at step 760. However, in step 745, if CPU 120 determines that the UN-FREEZE button has been pressed, then, in step 750, CPU 120 deletes graphic data 320 from RAM 120. Then, in step 755, CPU 120 sets the video input flag to ON and CPU 120 continues processing the FIG. 7 method steps at step 760.

In step 760, CPU 120 determines whether the system user has pressed the SEND button on keyboard 102. If the SEND button has not been pressed, then the system continues processing at step 775. In step 775, CPU 120 determines whether the system user has entered key input from keyboard 102. If the system user has entered key input, then, in step 780, e-mail manager 210 responsively incorporates and saves the key input as text data 330 and display module 230 displays the text data 330 on television 130. CPU 120 then continues processing the FIG. 7 method steps at step 785.

In step 785, CPU 120 determines whether the video input flag is set to ON. If video input flag is set to ON, then, at step 790, display module 230 combines image input data 310 with text data 330 and returns to step 720 to display image input data 310 and text data 330 on television 130. If, in step 785, CPU 120 determines that video input flag is set to OFF, then, at step 795, display module 230 combines graphic data 320 with text data 330 and returns to step 720 to display graphic data 320 and text data 330 on television 130.

Referring again to step 760, if CPU 120 determines that the SEND button has been pressed, then, in step 765, e-mail conversion module 240 converts graphic data 320 and text data 330 into e-mail document 350, which is suitable for processing by e-mail manager 210. If the video input flag is set to ON, graphic conversion module 220 first converts image input data 310 into graphic data 320 as described in reference to method step 735 above. Then, in step 770, e-mail manager 210 forwards e-mail document 350 to Internet 150 and CPU 120 terminates the execution of the FIG. 7 process.

The invention has been explained above with reference to a preferred embodiment. Other embodiments will be apparent to those skilled in the art in light of this disclosure. For example, the present invention may be readily implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus for incorporating image data into an electronic document, comprising:
   a conversion module configured to manipulate information data and said image data;
   a processor, coupled to said apparatus, to control said conversion module and thereby produce said electronic document;
   a display module configured to display said image data and said information data; and
   a graphic module configured to convert said image data into graphic data, wherein said graphic module converts said image data in response to a freeze operation.

2. An apparatus for incorporating image data into an electronic document, comprising:
   a conversion module configured to manipulate information data and said image data;
   a processor, coupled to said apparatus, to control said conversion module and thereby produce said electronic document;
   a display module configured to display said image data and said information data;
   a graphic module configured to convert said image data into graphic data; and
   an e-mail conversion module configured to convert said graphic data and said information data into said electronic document, wherein said e-mail conversion module converts said graphic data and said information data in response to a send option.

3. A method of incorporating image data into an electronic document comprising the steps of:
   receiving said image data;
   receiving information data;
   processing said image data and said information data to produce said electronic document;
   converting said image data into graphic data; and
   displaying said graphic data and said information data, wherein said step of converting said image data is performed in response to a freeze control operation.

4. A method of incorporating image data into an electronic document comprising the steps of:
   receiving said image data;
   receiving information data;
   processing said image data and said information data to produce said electronic document;
   converting said image data into graphic data;
   displaying said graphic data and said information data; and
   deleting said graphic data, wherein said step of deleting is performed in response to an un-freeze control option.

5. A method of incorporating image data into an electronic document comprising the steps of:
   receiving said image data;
   receiving information data;
   processing said image data to produce said electronic document;
   converting said image data into graphic data;
   displaying said graphic data and said information data;
   converting said graphic document and said information data into said electronic document; and
   sending said electronic document to a networked source, wherein said step of converting is performed in response to a send control option.

6. A computer readable medium comprising program instructions for incorporating image data into an electronic document, by performing the steps of:
   receiving said image data;
   receiving information data;
   processing said image data and said information data to produce said electronic document;
   converting said image data into graphic data; and
   displaying said graphic data and said information data, wherein said step of converting said image data is performed in response to a freeze control option.

7. A computer readable medium comprising program instructions for incorporating image data into an electronic document, by performing the steps of:

receiving said image data;

receiving information data;

processing said image data and said information data to produce said electronic document;

converting said image data into graphic data;

displaying said graphic data and said information data; and deleting said graphic data, wherein said step of deleting is performed in response to an un-freeze control option.

8. A computer readable medium comprising program instructions for incorporating image data into an electronic document, by performing the steps of:

receiving said image data;

receiving information data;

processing said image data and said information data to produce said electronic document;

converting said image data into graphic data;

displaying said graphic data and said information data;

converting said graphic data and said information data into said electronic document; and sending said electronic document to a networked source, wherein said step of converting is performed in response to a send control option.

* * * * *